United States Patent
VandenBerg, III et al.

(10) Patent No.: US 10,875,511 B2
(45) Date of Patent: Dec. 29, 2020

(54) SYSTEMS AND METHODS FOR BRAKE REDUNDANCY FOR AN AUTONOMOUS VEHICLE

(71) Applicant: UATC, LLC, San Francisco, CA (US)

(72) Inventors: Dirk John VandenBerg, III, Pittsburgh, PA (US); Nicholas G. Letwin, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 338 days.

(21) Appl. No.: 15/875,000

(22) Filed: Jan. 19, 2018

(65) Prior Publication Data

US 2019/0168724 A1 Jun. 6, 2019

Related U.S. Application Data

(60) Provisional application No. 62/614,545, filed on Jan. 8, 2018, provisional application No. 62/595,193, filed on Dec. 6, 2017.

(51) Int. Cl.
| | |
|---|---|
| *B60T 8/94* | (2006.01) |
| *B60T 7/12* | (2006.01) |
| *B60T 8/171* | (2006.01) |
| *B60T 8/88* | (2006.01) |
| *B60T 8/58* | (2006.01) |
| *B60T 8/172* | (2006.01) |

(Continued)

(52) U.S. Cl.
CPC ................... *B60T 8/94* (2013.01); *B60T 7/12* (2013.01); *B60T 7/22* (2013.01); *B60T 8/171* (2013.01); *B60T 8/172* (2013.01); *B60T 8/58* (2013.01); *B60T 8/885* (2013.01); *B60T 8/96* (2013.01); *B60T 8/321* (2013.01); *B60T 2201/022* (2013.01); *B60T 2270/402* (2013.01); *B60T 2270/413* (2013.01); *G01S 2013/9323* (2020.01); *G01S 2013/93185* (2020.01)

(58) Field of Classification Search
CPC ..... B60T 8/09; B60T 7/12; B60T 7/22; B60T 8/171; B60T 8/172; B60T 8/58; B60T 8/885; B60T 8/96; B60T 8/321; B60T 2201/022; B60T 2270/402; B60T 2270/413; B60T 8/94; G01S 2013/9323; G01S 2013/93185
USPC .......................................................... 701/24
See application file for complete search history.

(56) References Cited

U.S. PATENT DOCUMENTS

| 2017/0043755 A1* | 2/2017 | Sautter .................... B60T 8/885 |
| 2017/0166173 A1* | 6/2017 | Lauffer .................... B60T 8/17 |

* cited by examiner

*Primary Examiner* — Paula L Schneider
(74) *Attorney, Agent, or Firm* — Dority & Manning, PA

(57) ABSTRACT

Systems and methods for brake redundancy for an autonomous vehicle are provided. An autonomous vehicle braking system can include a primary brake control module comprising one or more processors. The primary brake control module can be configured to brake an autonomous vehicle in response to receiving a braking command from a vehicle autonomy system of the autonomous vehicle. The autonomous vehicle braking system can further include a secondary brake control module comprising one or more processors. The secondary brake control module can be configured to determine a failure of the primary brake control module to brake the autonomous vehicle in response to receiving the braking command. In response to determining the failure of the primary brake control module to brake the autonomous vehicle, the secondary brake control module can be configured to implement a braking action for the autonomous vehicle.

20 Claims, 7 Drawing Sheets

(51) Int. Cl.
*B60T 7/22* (2006.01)
*B60T 8/96* (2006.01)
*B60T 8/32* (2006.01)
*G01S 13/931* (2020.01)

SYSTEMS AND METHODS FOR BRAKE REDUNDANCY FOR AN AUTONOMOUS VEHICLE

PRIORITY CLAIM

The present application is based on and claims benefit of U.S. Provisional Application 62/595,193 having a filing date of Dec. 6, 2017 and U.S. Provisional Application 62/614,545 having a filing date of Jan. 8, 2018, which are incorporated by reference herein.

FIELD

The present disclosure relates generally to devices, systems, and methods for braking redundancy for an autonomous vehicle.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to an autonomous vehicle braking system. The autonomous vehicle braking system can include a primary brake control module comprising one or more processors. The primary brake control module can be configured to brake an autonomous vehicle in response to receiving a braking command from a vehicle autonomy system of the autonomous vehicle. The autonomous vehicle braking system can further include a secondary brake control module comprising one or more processors. The secondary brake control module can be configured to determine a failure of the primary brake control module to brake the autonomous vehicle in response to receiving the braking command. In response to determining the failure of the primary brake control module to brake the autonomous vehicle, the secondary brake control module can be configured to implement a braking action for the autonomous vehicle.

Another example aspect of the present disclosure is directed to a method for braking an autonomous vehicle. The method can include receiving, by one or more processors of a secondary brake control module, a braking command for a primary brake control module of the autonomous vehicle. The method can further include determining, by the one or more processors, a failure of the primary brake control module based at least in part on the braking command. In response to determining the failure of the primary brake control module, the method can further include implementing, by the one or more processors, a braking action to brake the autonomous vehicle.

Another example aspect of the present disclosure is directed to an autonomous vehicle. The autonomous vehicle can include a vehicle autonomy system comprising one or more processors. The vehicle autonomy system can be configured to generate a braking command for the autonomous vehicle. The autonomous vehicle can further include a braking system. The braking system can include a primary brake control module comprising one or more processors. The primary brake control module can be configured to receive the braking command generated by the vehicle autonomy system, and in response to receiving the braking command, brake the autonomous vehicle. The braking system can further include a secondary brake control module comprising one or more processors. The secondary brake control module can be configured to determine a failure of the primary brake control module to brake the autonomous vehicle in response to the braking command. In response to determining the failure of the primary brake control module to brake the autonomous vehicle, the secondary brake control module can further be configured to implement a braking action for the autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
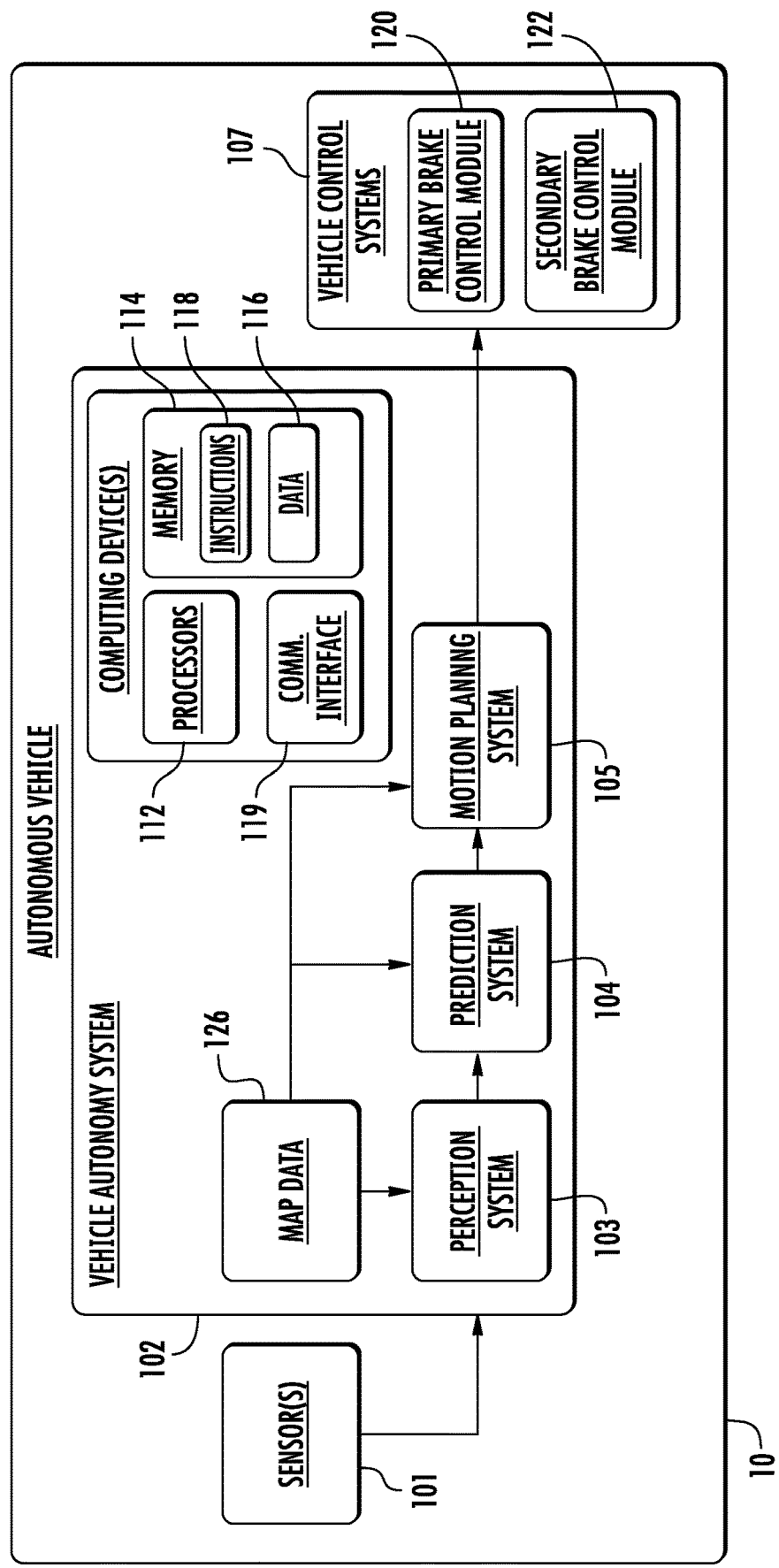
FIG. 1 depicts an example autonomous vehicle according to example aspects of the present disclosure.

Example aspects of the present disclosure are directed to systems and methods for braking an autonomous vehicle in response to a primary brake control module fault or failure. As used herein, the term "brake" can mean to decelerate and/or immobilize a vehicle, such as an autonomous vehicle. For example, an autonomous vehicle braking system can include a primary brake control module configured to decelerate and/or immobilize the autonomous vehicle in response to receiving a braking command from an autonomy system of the autonomous vehicle. For example, in some implementations, a vehicle autonomy system can determine a motion plan for the autonomous vehicle, and one or more vehicle interface modules ("VIMs") can convert the motion plan into vehicle actuation commands, such as a braking commands, steering commands, etc. to control the autonomous vehicle. The primary brake control module can be configured to receive the braking command, and in response, provide control signals to various brake systems of the autonomous vehicle, such as a service brake system, electronic parking brake, hydraulic brake system, or other braking system to brake the autonomous vehicle. In this way, the primary brake control module can be configured to brake the autonomous vehicle in response to receiving a braking command from a vehicle autonomy system.

The autonomous vehicle braking system can further include a secondary brake control module. The secondary brake control module can be configured to determine a failure of the primary brake control module to brake the autonomous vehicle in response to receiving the braking command. For example, should the primary brake control module become damaged, disconnected, or unpowered, the primary brake control module may fail to brake the autonomous vehicle, such as by failing to send a control signal to a brake system component to cause the autonomous vehicle to decelerate and/or stop. The secondary brake control module can be configured to determine that the primary brake control module has failed to brake the autonomous vehicle. For example, in some implementations, the secondary brake control module can be configured to monitor control signals from the primary brake control module, or receive data indicative of a vehicle state, such as data from a wheel speed sensor or inertial measurement unit ("IMU") indicating a failure to decelerate, and determine that the primary brake control module has experienced a fault or failure based at least in part on the data indicative of the vehicle state and/or the lack of any brake control signals from the primary brake control module. Further, in response to determining the fault or failure of the primary brake control module, the secondary brake control module can implement a braking action for the autonomous vehicle. For example, in some implementations, the secondary brake control module can control a hydraulic braking system or an electronic parking brake to decelerate and/or stop the autonomous vehicle. In this way, the secondary brake control module can be configured to determine a fault or failure of the primary brake control module, and in response, implement a braking action for the autonomous vehicle.

More particularly, an autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). In some implementations, the autonomous vehicle can include a vehicle autonomy system that assists in controlling the autonomous vehicle. For example, the vehicle autonomy system can include one or more processors and one or more memory devices, and can include one or more subsystems to assist in autonomous operation. For example, in some implementations, the vehicle autonomy system can include a perception system, a prediction system, and a motion planning system that cooperate to perceive the surrounding environment of the autonomous vehicle and determine a motion plan for controlling the motion of the autonomous vehicle accordingly.

For example, one or more sensors of the autonomous vehicle can obtain sensor data associated with one or more objects within the surrounding environment of the autonomous vehicle. In some implementations, the perception system can receive the sensor data and generate state data descriptive of the one or more objects, such as data describing the position, velocity, heading, acceleration, size, type, etc. for each object. In some implementations, the prediction system can create prediction data associated with each respective object within the surrounding environment, which can be indicative of one or more predicted future locations and/or trajectories of each respective object. In some implementations, the motion planning system can then determine a motion plan for the autonomous vehicle based on the predicted locations and/or trajectories for the objects. For example, the motion planning system can determine the motion plan for the autonomous vehicle to navigate around and/or in response to the perceived objects and their predicted trajectories.

The motion planning system can then provide the motion plan to a vehicle control system. For example, in some implementations, the vehicle control system can include one or more processors and one or more memory devices, and can be configured to control the motion of autonomous vehicle according to the motion plan. For example, the vehicle control system can include one or more VIMs, which can be configured to receive the motion plan (e.g., a trajectory for the autonomous vehicle to travel) from the vehicle autonomy system, and can determine vehicle actuation commands accordingly, such as longitudinal acceleration commands (e.g., acceleration or braking commands), steering wheel angles, or other commands. The one or more VIMs can then provide the vehicle actuation commands to various control systems of the autonomous vehicle, such as one or more brake systems, steering systems, cruise control systems, or other systems. In some implementations, the one or more VIMs can provide the vehicle actuation commands to the control systems over one or more vehicle communication area networks ("CANs"). For example, in various implementations, a power steering control module ("PSCM"), active safety domain master ("ASDM"), vehicle dynamics domain master ("VDDM"), and/or other control system component can be configured to send and/or receive respective vehicle actuation commands over one or more CANs. In this way, the vehicle control system can receive a motion plan from the vehicle autonomy system, and in response, control the autonomous vehicle accordingly.

According to example aspects of the present disclosure, the autonomous vehicle can further include a braking system, which can include a primary brake control module. In some implementations, the primary brake control module can include one or more processors, and can be configured to brake an autonomous vehicle in response to receiving a braking command from an autonomy system of the autonomous vehicle. In some implementations, the primary brake control module can be included in or otherwise a part of a VDDM. For example, the VDDM can be configured to control gear-shifting, throttle set points, service brake systems, hydraulic brake systems, electronic parking brakes ("EPBs", also referred to as "electric parking brakes" and/or "emergency parking brakes"), and other control systems. In some implementations, the primary brake control module can be a subcomponent of the VDDM, while in other implementations, the primary brake control module can be a stand-alone brake control module.

The primary brake control module can be configured to receive braking commands, such as braking commands from one or more VIMs via a CAN, and in response, brake the autonomous vehicle. For example, in some implementations, the primary brake control module can control the service brakes of the autonomous vehicle (i.e., primary brake calipers configured to brake one or more wheels of the autonomous vehicle) by sending a control signal to an actuator associated with the respective brake calipers. In some implementations, the primary brake control module can be configured to control or otherwise interface with an anti-lock braking system ("ABS") to brake the autonomous vehicle. In some implementations, the primary brake control module can control a hydraulic pump, such as by sending a valve control signal to a hydraulic braking system in order to brake the vehicle. For example, in some implementations, the primary brake control module can send the valve control signal to a vacuum booster of a hydraulic braking system, which can use a vacuum from the engine of the vehicle to provide or increase the braking pressure applied to one or more hydraulic brakes. In some implementations, the primary brake control module can control an EPB to brake the autonomous vehicle. For example, the primary brake control module can send a motor control signal to the EPB in order to cause the EPB to brake. In this way, the primary brake control module can be configured to receive a braking command from the autonomy system, and in response, brake the autonomous vehicle.

According to additional aspects of the present disclosure, the braking system can further include a secondary brake control module. The secondary brake control module can include one or more processors, and can be configured to determine a failure of the primary brake control module to brake the autonomous vehicle. For example, in some implementations, the secondary brake control module can be configured to receive the braking command sent to the primary brake control module, such as from a VIM over a CAN. In some implementations, the secondary brake control module can be configured to receive the braking command from the primary brake control module. In some implementations, the secondary brake control module can be configured to receive and/or monitor control signals sent from the primary brake control module to one or more brake systems. For example, in some implementations the secondary brake control module can receive a braking command from the VIM, but not receive or otherwise detect a corresponding control signal from the primary brake control module. In such a situation, the secondary brake control module can be configured to determine the primary brake control module has failed to brake the autonomous vehicle.

In some implementations, the secondary brake control module can further be configured to receive data indicative of a vehicle state. The data indicative of a vehicle state can include data indicative of a vehicle acceleration. For example, in some implementations, the autonomous vehicle can include one or more wheel speed sensors ("WSSs"). The one or more wheel speed sensors can be configured to measure a rotation of a respective wheel of the autonomous vehicle. For example, as the autonomous vehicle travels, a WSS can be configured to measure a rotation of the wheel, from which a longitudinal velocity, acceleration, and/or position can be determined. In some implementations, a WSS can be configured to provide data indicative of the vehicle state to the secondary brake control module by sending a signal to the secondary brake control module.

Similarly, in some implementations, an autonomous vehicle can include one or more inertial measurement units ("IMUs"). For example, an IMU can include one or more accelerometers and/or one or more gyroscopes, and can be configured to obtain acceleration measurements along various axes (e.g., in three dimensions). In some implementations, an IMU can be configured to provide data indicative of the vehicle state to the secondary brake control module by sending a signal to the secondary brake control module.

In some implementations, the secondary brake control module can be configured to determine a fault or failure of the primary brake control module based at least in part on the braking command and/or data indicative of the vehicle state. For example, should a braking command be sent by a VIM to the primary brake control module, but no corresponding control signal be sent by the primary brake control module to a brake system, the secondary brake control module can determine that the primary brake control module has faulted or failed, and therefore failed to brake the autonomous vehicle. Similarly, in some implementations, the secondary brake control module can determine whether the vehicle is decelerating in response to and/or in accordance with the braking command. For example, in some implementations, the secondary brake control module can be configured to determine that the primary brake control module has failed to brake the autonomous vehicle based on data indicative of a vehicle state which indicates that no deceleration has occurred following receipt of a braking command.

According to additional aspects of the present disclosure, the secondary brake control module can further be configured to implement a braking action for the autonomous vehicle in response to determining the failure of the primary brake control module to brake the autonomous vehicle. For example, in some implementations, the secondary brake control module can implement the braking action by controlling a hydraulic braking system to brake the autonomous vehicle. For example, a valve control signal can be sent by the secondary brake control module to a vacuum booster of a hydraulic braking system, which can cause the hydraulic braking system to brake the autonomous vehicle. Additionally, or alternatively, a control signal can be sent to by the secondary brake control module to a brake booster of the hydraulic braking system, which can cause the hydraulic braking system to brake the autonomous vehicle, as further described herein.

In some implementations, the secondary brake control module can be configured to implement a braking action by controlling an EPB to brake the autonomous vehicle. For example, the secondary brake control module can send a motor control signal to an EPB to cause the EPB to brake the autonomous vehicle.

In some implementations, the autonomous vehicle braking system can further include a primary power source configured to provide power to the primary brake control module. For example, in some implementations, the primary power source can be a 12V DC power source, and can be configured to power a VIM, a VDDM, a stand-alone primary brake control module, a PSCM, an ASDM, a secondary brake control module, and/or other braking system component.

In some implementations, the braking system can also include an auxiliary power source configured to provide power to the secondary brake control module. For example, the auxiliary power source can be a separate power source, such as a backup power source, and can be configured to provide auxiliary power to one or more components of the braking system. For example, in some implementations, the auxiliary power source can be configured to provide auxiliary power to one or more VIMs in addition to the secondary brake control module. In some implementations, the secondary brake control module can be configured to receive power from both the primary and the auxiliary power sources.

In some implementations, the secondary brake control module can be configured to determine that the primary brake control module has failed to brake the autonomous vehicle in response to the braking command by determining that the primary power source has faulted. For example, in some implementations, the secondary brake control module can be configured to receive a signal from the primary power source, power from the primary power source, a signal from the primary brake control module, and/or a signal from a voltage meter or current meter configured to monitor a voltage or current, respectively, associated with the primary power source. For example, should the voltage or current drop below a threshold, or should a power signal fail to be provided by the primary power source and/or the primary brake control module, the secondary brake control module can determine that the primary power source has faulted. Further, when the primary power source has faulted, the secondary brake control module can be configured to determine that the primary brake control module has failed to brake the autonomous vehicle, as the unpowered primary brake control module may be unable to provide control signals to one or more brake systems of the autonomous vehicle.

In some implementations, the secondary brake control module can be configured to receive signals from the primary brake control module, and in response, brake the autonomous vehicle. For example, in some implementations, the secondary brake control module can be coupled between the primary brake control module and one or more brake systems of the autonomous vehicle. The primary brake control module can be configured to receive a braking command from the vehicle autonomy system, and determine a control signal for a brake system based at least in part on the braking command. For example, the primary brake control module can determine a motor control signal for an EPB, or a valve control signal for a hydraulic braking system based on the braking command. The primary brake control module can then provide the control signal to the secondary brake control module, which can pass the control signal on to the respective brake system. For example, the secondary brake control module can receive a motor control signal for an EPB from the primary brake control module, and can provide the motor control signal to the EPB.

In some implementations, the braking system can include an arbitration module configured to receive control signals from the primary brake control module and the secondary brake control module. For example, the primary brake control module can be configured to provide a primary braking control signal to the arbitration module, and the secondary brake control module can be configured to provide a secondary brake control signal to the arbitration module. The arbitration module can be configured to implement the braking action based on the primary brake control signal and/or the secondary brake control signal. For example, should the arbitration module receive a brake control signal from only one of the primary brake control module or the secondary brake control module, the arbitration module can implement the braking action by, for example, sending the control signal to the associated brake system. In some implementations, should the arbitration module receive a brake control signal from both the primary brake control module and the secondary brake control module, the arbitration module can be configured to determine which braking action to implement. For example, in some implementations, whichever brake control module provides a control signal indicating the most braking (i.e., highest deceleration), the arbitration module can implement that braking action by providing the control signal to the associated brake system. In some implementations, the arbitration module can be included in or otherwise a part of the secondary brake control module.

In some implementations, a secondary brake control module can include various hardware components in order to allow the secondary brake control module to perform the functionality described herein. For example, the secondary brake control module can include one or more processors and one or more memory devices, which can store instructions and data in order to perform the functionality disclosed herein. In some implementations, the secondary brake control module can include appropriate communications harnesses in order to allow the secondary brake control module to communicate with other components of a vehicle control system, such as brake system harnesses (e.g., hydraulic braking system harness, EPB harness), a wheel speed sensor input harness, an IMU input harness, one or more VIM or CAN harnesses, a primary brake control module communication harness, and/or any other harnesses necessary to perform the functionality disclosed herein. Further, in some implementations, the secondary brake control module can include an auxiliary power source and/or a harness to allow the secondary brake control module to receive power from an auxiliary power source, as well as a harness to allow the secondary brake control module to receive power from a primary power source.

According to additional aspects of the present disclosure, a method for braking autonomous vehicle can be implemented by a secondary brake control module. The method can include receiving a braking command for a primary brake control module of the autonomous vehicle. For example, in some implementations, a vehicle autonomy system can provide a motion plan to a vehicle control system. The control system can include one or more VIMs, which can convert the motion plan to a braking command. The braking command can be provided by the one or more VIMs to the primary brake control module, and can similarly provide the braking command to the secondary brake control module.

The method can further include determining a fault or failure of the primary brake control module based at least in part on the braking command. For example, in some implementations, the primary brake control module can receive the braking command from the vehicle autonomy system (such as via the one or more VIMs), and based on the braking command, the primary brake control module can send a control signal to a brake system in order to brake the autonomous vehicle. For example, a valve control signal can be sent to a hydraulic braking system, or a motor control signal can be sent to an EPB. In some implementations, the secondary brake control module can be configured to determine a fault or failure of the primary brake control module by, for example, receiving the braking command, but not receiving a corresponding brake system control signal. For example, in some implementations, the secondary brake control module can be configured to receive control signals from the primary brake control module, and provide the control signals to the respective brake systems. In other implementations, the primary brake control module can be configured to provide control signals to one or more brake systems, such as over a CAN, and the secondary brake control module can be configured to monitor such control signals. Should the primary brake control module fail to provide a control signal to a brake system following receipt of the braking command from the vehicle autonomy system, the secondary brake control module can be configured to determine the primary brake control module has faulted or failed. In this way, the secondary brake control module can determine a fault or failure of the primary brake control module to control a brake system of the autonomous vehicle to brake the vehicle.

In some implementations, the method can further include receiving data indicative of a vehicle state. For example, in some implementations, one or more WSSs and/or IMUs can be configured to provide data indicative of a vehicle state to the secondary brake control module. The data indicative of the vehicle state can include, for example, data indicative of the longitudinal acceleration of the vehicle. In some implementations, the secondary brake control module can determine the primary brake control module has failed to brake the autonomous vehicle based at least in part on the data indicative of the vehicle state. For example, should the autonomous vehicle not decelerate or not decelerate at a sufficient rate following receipt of a braking command from the vehicle autonomy system, the secondary brake control module can determine the primary brake control module has failed to brake the autonomous vehicle.

In some implementations, the method can include determining a fault or failure of the primary brake control module by determining a fault or failure of a primary power source configured to provide power to the primary brake control module. For example, in some implementations, a primary power source can power one or more braking system components, such as a primary brake control module, a VDDM, a VIM, a PSCM, an ASDM, and/or another braking system component. In some implementations, an auxiliary power source can be configured to provide auxiliary (i.e., backup) power to a secondary brake control module and or/other braking system component. In some implementations, the secondary brake control module can be configured to receive power from both the primary and the auxiliary power sources. Should the secondary brake control module determine that the primary power source has faulted or failed, the secondary brake control module can be configured to determine a fault or failure of the primary brake control module to brake the autonomous vehicle.

The method can further include implementing a braking action to brake the autonomous vehicle in response to determining the fault or failure of the primary brake control module. For example, in some implementations, the secondary brake control module can control a hydraulic braking system to brake the autonomous vehicle. For example, the secondary brake control module can send a valve control signal to a vacuum booster of a hydraulic braking system, which can cause one or more hydraulic brakes to brake the autonomous vehicle. Additionally, or alternatively, a control signal can be sent to by the secondary brake control module to a brake booster of the hydraulic braking system, which can help cause the one or more hydraulic brakes to brake the autonomous vehicle, as further described herein. In some implementations, the secondary brake control module can control an EPB to brake the autonomous vehicle. For example, a motor control signal can be sent to the EPB to cause the EPB to brake the autonomous vehicle.

In some implementations, implementing a braking action can include decelerating the vehicle, such as by reducing a velocity of the vehicle. In some implementations, implementing a braking action can include decelerating the vehicle to a complete stop. In some implementations, implementing a braking action can include bringing the vehicle to a complete stop and preventing future movement of the vehicle, such as by locking an EPB until a reset of the braking system has occurred.

In some implementations, implementing the braking action to brake the autonomous vehicle can include providing a brake signal to an arbitration module. For example, in some implementations, an arbitration module can be configured to receive control signals from both the primary brake control module and the secondary brake control module. In such a configuration, the secondary brake control module can be configured to implement the braking action by providing a brake signal to the arbitration module, as disclosed herein.

The systems and methods described herein may provide a number of technical effects and benefits. For example, the systems and methods disclosed herein provide for a level of redundancy in a braking system of an autonomous vehicle. Should a primary brake control module fail, such as due to damage to the primary brake control module, a loss of power to the primary brake control module, an interruption in network communication, such as due to disconnection from a CAN, and/or another fault or failure mode, a secondary brake control module can monitor the performance of the primary brake control module, and determine that the primary brake control module has failed to brake the autonomous vehicle. Further, the secondary brake control module can implement a braking action in order to decelerate and/or stop the autonomous vehicle in response to such a fault or failure.

In turn, the systems and methods disclosed herein can improve the safety of autonomous vehicle passengers. For example, by allowing for a redundant braking system which can detect and respond to faults or failures of a primary brake control module, such faults or failures can be mitigated by the secondary brake control module's ability to decelerate and immobilize the autonomous vehicle.

Moreover, the systems and methods disclosed herein can be implemented much more quickly than the average human response time, and thus represent an improvement over human vehicle operation. For example, a human vehicle operator may take more than 0.5-1 second to recognize a primary brake control module has failed to brake the autonomous vehicle before manually operating a brake pedal. By comparison, the systems methods disclosed herein can allow for fault signals to be communicated and faults or failures to be determined in as little as 25 to 50 ms. Thus, the systems and methods disclosed herein can respond to a fault or failure of a primary brake control module much more quickly than typical human vehicle operation, which can further increase the safety of passengers as well as the safety of others in the surrounding environment of the autonomous vehicle.

The systems and methods of the present disclosure also provide an improvement to vehicle computing technology, such as autonomous vehicle computing technology. For example, the systems and methods disclosed herein enable the vehicle technology to determine a fault or failure of a primary brake control module to brake the autonomous vehicle in response to receiving a braking command. For example, one or more processors can determine a fault or failure of a primary brake control module based at least in part on the fault or failure of the primary brake control module to send a brake control signal to a brake system in response to receiving a braking command, a fault or failure of a primary power source which provides power to the primary brake control module, and/or data indicative of a vehicle state, such as data indicating a fault or failure of the primary brake control module to decelerate the autonomous vehicle in response to a braking command. Further, the one or more processors can then implement a braking action for the autonomous vehicle in response to determining the fault or failure of the primary brake control module to brake the autonomous vehicle. For example, the one or more processors can be configured to send control signals to one or more brake systems in order to decelerate and/or immobilize the autonomous vehicle. Thus, the systems and methods of the present disclosure can improve the ability of a vehicle control system to control the motion of an autonomous vehicle.

With reference now to the FIGS., example aspects of the present disclosure will be discussed in further detail. FIG. 1 depicts a block diagram of an example vehicle 10 according to example aspects of the present disclosure. Vehicle 10 can be, for example, an autonomous vehicle. The vehicle 10 can include one or more sensors 101, a vehicle computing system 102, and one or more vehicle controls 107. The vehicle computing system 102 can assist in controlling the vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the vehicle 10 according to the motion path.

The vehicle computing system 102 can include one or more computing devices 111. The one or more computing devices 111 can include one or more processors 112 and one or more memory 114. The one or more processors 112 can be any suitable processing device (e.g., a processor core, a microprocessor, an ASIC, a FPGA, a computing device, a microcontroller, etc.) and can be one processor or a plurality of processors that are operatively connected. The one or more memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which can be executed by the processor 112 to cause vehicle computing system 102 to perform operations. The one or more computing devices 111 can also include a communication interface 119, which can allow the one or more computing devices 111 to communicate with other components of the vehicle 10 or external computing systems, such as via one or more wired or wireless networks.

As illustrated in FIG. 1, the vehicle computing system 102 can include a perception system 103, a prediction system 104, and a motion planning system 105 that cooperate to perceive the surrounding environment of the vehicle 10 and determine a motion plan for controlling the motion of the vehicle 10 accordingly. In some implementations, the perception system 103, the prediction system 104, the motion planning system 105 can be included in or otherwise a part of a vehicle autonomy system. As used herein, the term "vehicle autonomy system" refers to a system configured to control the movement of an autonomous vehicle.

In particular, in some implementations, the perception system 103 can receive sensor data from the one or more sensors 101 that are coupled to or otherwise included within the vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the vehicle 10. The positioning system can be any device or circuitry for analyzing the position of the vehicle 10. For example, the positioning system can determine a position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the vehicle computing system 102.

Thus, the one or more sensors 101 can be used to collect sensor data that includes information that describes the location (e.g., in three-dimensional space relative to the vehicle 10) of points that correspond to objects within the surrounding environment of the vehicle 10. In some implementations, the sensors 101 can be located at various different locations on the vehicle 10. As an example, in some implementations, one or more cameras and/or LIDAR sensors can be located in a pod or other structure that is mounted on a roof of the vehicle 10 while one or more RADAR sensors can be located in or behind the front and/or rear bumper(s) or body panel(s) of the vehicle 10. As another example, camera(s) can be located at the front or rear bumper(s) of the vehicle 10 as well. Other locations can be used as well.

In addition to the sensor data, the perception system 103 can retrieve or otherwise obtain map data 126 that provides detailed information about the surrounding environment of the vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

The perception system 103 can identify one or more objects that are proximate to the vehicle 10 based on sensor data received from the one or more sensors 101 and/or the map data 126. In particular, in some implementations, the perception system 103 can determine, for each object, state data that describes a current state of such object (also referred to as features of the object). As examples, the state data for each object can describe an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 10; minimum path to interaction with the vehicle 10; minimum time duration to interaction with the vehicle 10; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The prediction system 104 can generate prediction data associated with each of the respective one or more objects within the surrounding environment of the vehicle 10. The prediction data can be indicative of one or more predicted future locations of each respective object. For example, the prediction data can be indicative of a predicted trajectory (e.g., predicted path) of at least one object within the surrounding environment of the vehicle 10. For example, the predicted trajectory (e.g., path) can indicate a path along which the respective object is predicted to travel over time (and/or the speed at which the object is predicted to travel along the predicted path).

For example, in some implementations, the prediction system 104 can be a goal-oriented prediction system that generates one or more potential goals, selects one or more of the most likely potential goals, and develops one or more trajectories by which the object can achieve the one or more selected goals. For example, the prediction system 104 can include a scenario generation system that generates and/or scores the one or more goals for an object and a scenario development system that determines the one or more trajectories by which the object can achieve the goals. In some implementations, the prediction system 104 can include a machine-learned goal-scoring model, a machine-learned trajectory development model, and/or other machine-learned models.

In some implementations, the prediction system 104 can use state data indicative of an object type or classification to predict a trajectory for the object. As an example, the prediction system 104 can use state data provided by the perception system 103 to determine that particular object (e.g., an object classified as a vehicle) approaching an intersection and maneuvering into a left-turn lane intends to turn left. In such a situation, the prediction system 104 can predict a trajectory (e.g., path) corresponding to a left-turn for the vehicle such that the vehicle turns left at the intersection. Similarly, the prediction system 104 can determine predicted trajectories for other objects, such as bicycles, pedestrians, parked vehicles, etc. The prediction system 104 can provide the predicted trajectories associated with the object(s) to the motion planning system 105.

The motion planning system 105 can determine a motion plan for the vehicle 10 based at least in part on the predicted trajectories associated with the objects within the surrounding environment of the vehicle and/or the state data for the objects provided by the perception system 103. Stated differently, given information about the current locations of objects and/or predicted trajectories of objects within the surrounding environment of the vehicle 10, the motion planning system 105 can determine a motion plan for the vehicle 10 that best navigates the vehicle 10 relative to the objects at such locations and their predicted trajectories.

In some implementations, the motion planning system 105 can evaluate one or more cost functions and/or one or more reward functions for each of one or more candidate motion plans for the vehicle 10. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 105 can determine a total cost (e.g., a sum of the cost(s) and/or reward(s) provided by the cost function(s) and/or reward function(s)) of adhering to a particular candidate pathway. The motion planning system 105 can select or determine a motion plan for the vehicle 10 based at least in part on the cost function(s) and the reward function(s). For example, the motion plan that minimizes the total cost can be selected or otherwise determined. The motion plan can be, for example, a path along which the vehicle 10 will travel in one or more forthcoming time periods. In some implementations, the motion planning system 105 can be configured to iteratively update the motion plan for the vehicle 10 as new sensor data is obtained from one or more sensors 101. For example, as new sensor data is obtained from one or more sensors 101, the sensor data can be analyzed by the perception system 103, the prediction system 104, and the motion planning system 105 to determine the motion plan.

Each of the perception system 103, the prediction system 104, and the motion planning system 105 can be included in or otherwise a part of a vehicle autonomy system configured to determine a motion plan based at least in part on data obtained from one or more sensors 101. For example, data obtained by one or more sensors 101 can be analyzed by each of the perception system 103, the prediction system 104, and the motion planning system 105 in a consecutive fashion in order to develop the motion plan. While FIG. 1 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

The motion planning system 105 can provide the motion plan to one or more vehicle control systems 107 to execute the motion plan. For example, the one or more vehicle control systems 107 can include throttle systems, brake systems, steering systems, and other control systems, each of which can include various vehicle controls (e.g., actuators or other devices that control gas flow, steering, braking, etc.) to control the motion of the vehicle. The various control systems 107 can include one or more controllers, control devices, and/or processors.

For example, according to example aspects of the present disclosure, in some implementations, the vehicle control systems 107 can include a primary brake control module 120 and a secondary brake control module 122. The primary brake control module 120 can be configured to receive a braking command from the vehicle autonomy system of a vehicle 10 (e.g., from a motion planning system 105), and in response, brake the vehicle 10. As will be discussed in greater detail with respect to FIGS. 2-4 and 6-7, the secondary brake control module 122 can be configured to determine a failure of the primary brake control module 120 to brake the vehicle 10 in response to receiving the braking command. Further, in response to determining the failure of the primary brake control module 120 to brake the vehicle 10, the secondary brake control module 122 can implement a braking action for the vehicle 10.

Each of the perception system 103, the prediction system 104, the motion planning system 105, and the vehicle control systems 107 can include computer logic utilized to provide desired functionality. In some implementations, each of the perception system 103, the prediction system 104, the motion planning system 105, and the vehicle control systems 107 can be implemented in hardware, firmware, and/or software controlling a general purpose processor. For example, in some implementations, each of the perception system 103, the prediction system 104, the motion planning system 105, and the vehicle control systems 107 includes program files stored on a storage device, loaded into a memory and executed by one or more processors. In other implementations, each of the perception system 103, the prediction system 104, the motion planning system 105, and the vehicle control systems 107 includes one or more sets of computer-executable instructions that are stored in a tangible computer-readable storage medium such as RAM hard disk or optical or magnetic media.

Figure 2:
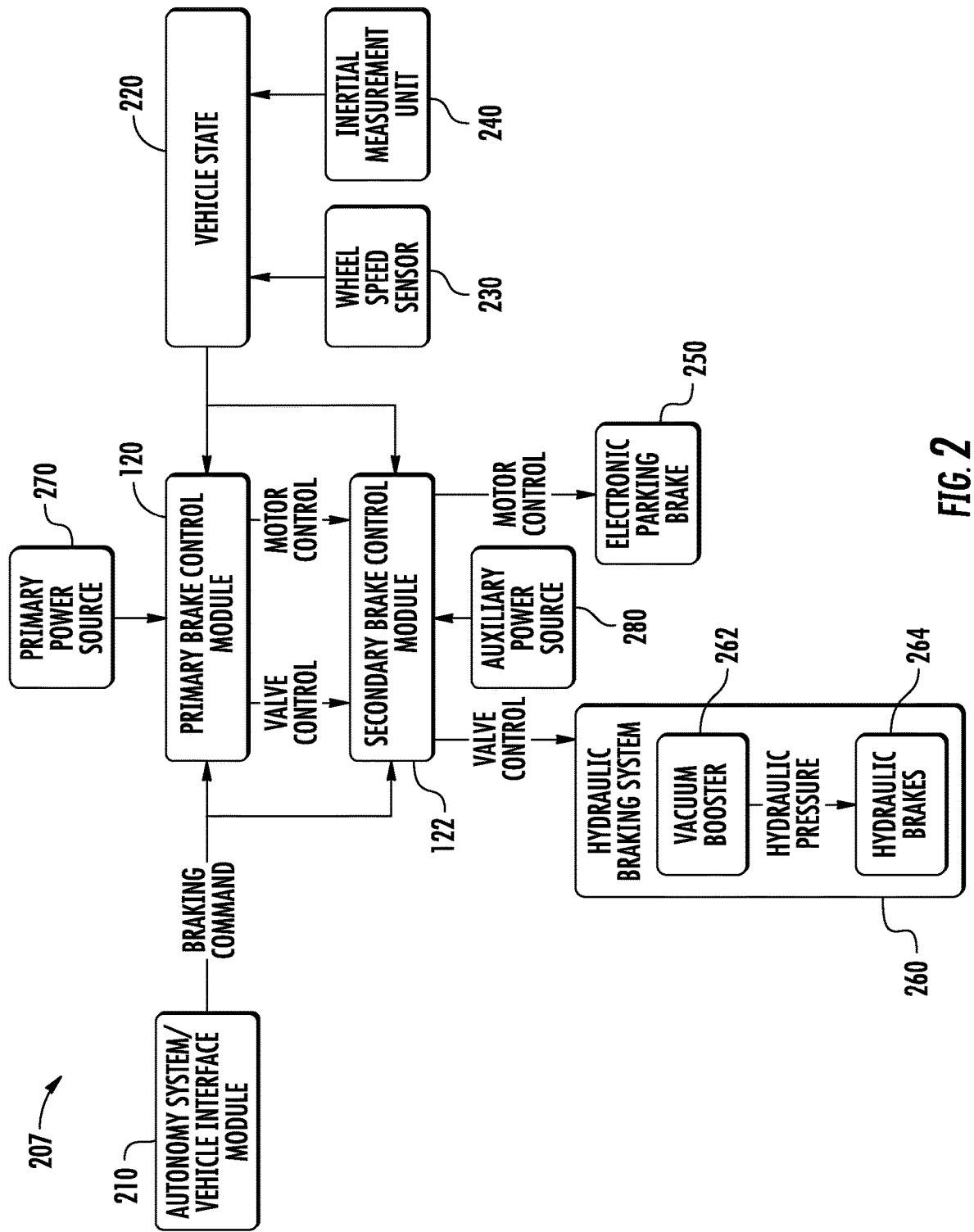
FIG. 2 depicts an example braking system for an autonomous vehicle according to example aspects of the present disclosure.

Referring now to FIG. 2, an example vehicle control system 207 according to example aspects of the present disclosure is depicted. The vehicle control system 207 can also be referred to as a braking system 207 or an autonomous vehicle braking system 207, and can be included in a vehicle 10. The vehicle control system 107 can include the braking system 207.

As shown, a vehicle autonomy system 210 can send a braking command to a primary brake control module 120. For example, in some implementations, a VIM can be configured to receive a motion plan from a motion planning system, and can convert the motion plan into vehicle actuation commands for various control systems, such as throttle systems, brake systems, steering systems, and/or other vehicle control systems. For example, the motion plan can include information about a trajectory and/or a velocity the vehicle 10 is to travel in a forthcoming time period, and the VIM can convert that motion plan into various control signals, such as braking commands. The braking command can be provided by the vehicle autonomy system 210 to the primary brake control module 120. For example, in some implementations, the braking command can be sent over one or more CANs.

The primary brake control module 120 can be configured to brake the vehicle in response to the braking command. For example, the braking system 207 can further include a hydraulic braking system 260, an EPB 250, and/or other brake systems.

For example, in some implementations, a hydraulic braking system 260 can include a vacuum booster 262. In response to receiving a braking command from the vehicle autonomy system 210, in some implementations, the primary brake control module 120 can send a valve control signal to the hydraulic braking system 260. The valve control signal can be, for example, a setpoint for the vacuum booster 262. In some implementations, the valve control signal can control a pneumatic valve and/or an electronically driven (e.g., motor/solenoid) valve. In some implementations, the valve control signal can be sent to a hydraulic pump and/or hydraulic distribution module (not shown in FIG. 2) to control the hydraulic pressure applied to one or more hydraulic brakes 264. For example, the braking command provided by the vehicle autonomy system 210 can be a command to decelerate the vehicle 10. In response, the primary brake control module 120 can provide a valve control signal to the vacuum booster 262 (or other control signal to another hydraulic braking system component), which can then apply hydraulic pressure to one or more hydraulic brakes 264. For example, in some implementations, the hydraulic braking system 260 can be configured to brake one or more service brakes associated with one or more wheels of a vehicle 10.

Further, in some implementations, the primary brake control module 120 can receive the braking command from a vehicle autonomy system 210, and in response, provide a signal to an EPB 250. For example, the braking command can be a command to immobilize the vehicle 10 to allow a passenger to exit the vehicle 10. The primary brake control module 120 can provide a motor control signal to the EPB 250. The EPB 250 can then immobilize the vehicle 10. The primary brake control module 120 can similarly be configured to brake other brake systems as well.

In some implementations, the primary brake control module 120 can be configured to brake the vehicle based at least in part on data indicative of a vehicle state 220. For example, in some implementations, the vehicle state 220 can describe a velocity, acceleration, position, or other state parameter for a vehicle 10.

For example, in some implementations, a wheel speed sensor ("WSS") 230 can be configured to obtain wheel speed measurements. The WSS 230 can obtain measurements of the rotation of a wheel of the vehicle 10, from which a position, a velocity, and/or an acceleration of the vehicle 10 can be determined. The primary brake control module 120 can be configured to receive data indicative of the vehicle state 220 from the WSS 230.

Similarly, in some implementations, an inertial measurement unit ("IMU") 240 can be configured to obtain acceleration measurements. For example, an IMU can include one or more accelerometers and/or one or more gyroscopes, and can be configured to obtain acceleration measurements along various axes (e.g., in three dimensions). The primary brake control module 120 can be configured to receive data indicative of the vehicle state 220 from the IMU 240.

The vehicle state 220 can be used, for example, to determine a valve control or motor control signal to be provided to a brake system (e.g., hydraulic braking system 260, EPB 250, or other brake system). For example, the braking command from the vehicle autonomy system 210 can be a command to reduce the velocity of the vehicle 10 from a first velocity to a second velocity. The vehicle state 220 can include data indicative of the current velocity and/or current acceleration (or deceleration) of the vehicle 10. The primary brake control module 120 can be configured to determine a valve control or motor control signal for the hydraulic braking system 260, EPB 250, or other brake system based on the data indicative of the vehicle state 220, such as the current velocity or acceleration. In this way, a primary brake control module 120 can receive a braking command from a vehicle autonomy system 210, and further can be configured to brake the vehicle 10.

In some implementations, the primary brake control module 120 can be powered by a primary power source 270. For example, in some implementations, the primary power source 270 can be a 12 V DC power system. In other implementations, the primary power source 270 can be an AC power system, and/or can operate at various voltages. In some implementations, other components, such as the electronic parking brake 250, the hydraulic braking system 260, wheel speed sensor 230, inertial measurement unit 240, VIM, or other components can also be powered by the primary power source 270.

According to example aspects of the present disclosure, a braking system 207 can also include a secondary brake control module 122. The secondary brake control module 122 can be configured to determine a failure of the primary brake control module 120 to brake the vehicle 10 in response to receiving the braking command. Further, the secondary brake control module 122 can be configured to implement a braking action for the vehicle 10 in response to determining the failure of the primary brake control module 120 to brake the vehicle 10.

For example, in some implementations, the vehicle autonomy system 210 can provide the braking command to the secondary brake control module 122 when the braking command is provided to the primary brake control module 120. For example, in some implementations, the vehicle autonomy system 210 can send the braking command over a CAN, and both the primary brake control module 120 and the secondary brake control module 122 can receive the braking command. In some implementations, the secondary brake control module 122 can be configured to monitor for various control signals sent over one or more CANs of the vehicle 10, such as braking commands from the vehicle autonomy system 210 and/or control signals (e.g., motor signals, valve control signals, etc.) from the primary brake control module 120.

In some implementations, the secondary brake control module 122 can be configured to receive the braking command from the primary brake control module 120. For example, in some implementations, the primary brake control module 120 can be configured to receive the braking command from the vehicle autonomy system 210 over a CAN, and further relay the braking command to the secondary brake control module 122. Thus, the secondary brake control module 122 can be configured to receive the braking command in a variety of ways.

In some implementations, the secondary brake control module 122 can further be configured to receive data indicative of the vehicle state 220. The data indicative of a vehicle state can include data indicative of a vehicle acceleration and/or vehicle velocity. For example, in some implementations, the secondary brake control module can be configured to receive data indicative of the vehicle state from a WSS 230 or an IMU 240.

In some implementations, the secondary brake control module 122 can be configured to determine a fault or failure of the primary brake control module 120 based at least in part on the braking command and/or data indicative of the vehicle state.

For example, in some implementations, the secondary brake control module 122 can be configured to receive and/or monitor control signals sent from the primary brake control module 120 to one or more brake systems, such as a hydraulic braking system 260 or an EPB 250. For example, in some implementations the secondary brake control module 122 can receive a braking command from the vehicle autonomy system 210, but not receive or otherwise detect a corresponding control signal from the primary brake control module 120. In such a situation, the secondary brake control module 122 can be configured to determine the primary brake control module 120 has failed to brake the vehicle 10.

Similarly, in some implementations, the secondary brake control module 122 can determine whether the vehicle is decelerating in response to and/or in accordance with the braking command. For example, in some implementations, the secondary brake control module 122 can be configured to determine that the primary brake control module 120 has failed to brake the vehicle 10 based on data indicative of the vehicle state 220 which indicates that no deceleration has occurred following receipt of a braking command from the vehicle autonomy system 210.

In some implementations, the secondary brake control module 122 can be configured to determine that the primary brake control module 120 has failed to brake the autonomous vehicle in response to the braking command by determining that the primary power source 270 has faulted. For example, in some implementations, the braking system 207 can include an auxiliary power source 280. The auxiliary power source can be, for example, a back-up or alternate power source, which can be configured to provide power to the secondary brake control module 122 and/or other components of the braking system 207. For example, in some implementations, the auxiliary power source 280 can be a 12V DC power source, such as one or more 12V batteries. In other implementations, the auxiliary power source 280 can be an AC power system, and/or can operate at various voltages. The auxiliary power source 280 can power the secondary brake control module 122 in the event of fault of the primary power source 270, thus allowing the secondary brake control module 122 to function even when the primary power source 270 has faulted.

For example, in some implementations, the secondary brake control module 122 can be configured to receive signals and/or power from the primary power source 270, signals and/or power from the primary brake control module 120, and/or signals from voltage or current meters (not shown) configured to monitor a voltage or current, respectively, associated with the primary power source 270. These signals and/or power can allow the secondary brake control module to monitor whether the primary power source 270 has faulted. Further, the secondary brake control module 122 can be configured to determine that the primary power source has faulted. As used herein, the term "faulted" when used in reference to a primary power source 270 refers to any operating condition such that power is not provided by the primary power source 270 to the primary brake control module 120 under normal operating conditions. For example, should the voltage or current from the primary power source 270 drop below a threshold for proper operation, should power and/or a power signal fail to be provided by the primary power source 270 and/or the primary brake control module 120, should a power connection be severed, and/or should any other fault mechanism occur, the secondary brake control module 122 can be configured to determine that the primary power source 270 has faulted. Further, should the primary power source 270 fault, the secondary brake control module 122 can be configured to determine that the primary brake control module 120 has failed to brake the vehicle 10, as the unpowered primary brake control module 120 may be unable to provide control signals to one or more brake systems of the vehicle 10, such as the hydraulic braking system 260, the EPB 250, or other brake system in order to brake the vehicle 10.

Thus, the secondary brake control module 122 can be configured to determine a failure of the primary brake control module 120 to brake the vehicle 10 in a variety of operating conditions. Further, in response to such a determination, the secondary brake control module 122 can implement a braking action.

For example, in some implementations, the secondary brake control module 122 can implement the braking action by controlling the hydraulic braking system 260 to brake the vehicle 10. For example, a valve control signal can be sent by the secondary brake control module 122 to a vacuum booster 262 of the hydraulic braking system 260, which can cause the hydraulic brakes 264 to brake the vehicle 10. Additionally, or alternatively, as described with reference to FIG. 3, a control signal can be sent by the secondary brake control module 122 to a brake booster 602 of the hydraulic braking system 260, which can cause the hydraulic brakes 606 to brake the vehicle 10.

Similarly, in some implementations, the secondary brake control module 122 can be configured to implement a braking action by controlling an EPB 250 to brake the vehicle 10. For example, the secondary brake control module 122 can send a motor control signal to an EPB 250 to cause the EPB 250 to brake the vehicle 10. The secondary brake control module 122 can be configured to send respective control signals to other brake systems to implement a braking action as well. In this way, the secondary brake control module 122 can implement a braking action in response to determining a failure of the primary brake control module 120 to brake the vehicle.

In some implementations, the secondary brake control module 122 can be coupled between the primary brake control module 120 and one or more brake systems of the vehicle 10. For example, as shown in FIG. 2, the secondary brake control module 122 is coupled between the primary brake control module 120 and the hydraulic braking system 260 and EPB 250. The primary brake control module 120 can provide valve control and motor control signals to the secondary brake control module 122, which can pass the control signals on to the hydraulic braking system 260 and the EPB 250. In such a configuration, the primary brake control module 120 can provide control signal(s) to the secondary brake control module 122, which can brake the vehicle 10 based at least in part on the control signal(s) from the primary brake control module 120. Further, in such a configuration, the secondary brake control module 122 can be configured to determine whether the primary brake control module 120 has failed to brake the vehicle by monitoring for control signals to one or more brake systems in response to a braking command from the vehicle autonomy system 210, as disclosed herein.

Figure 6:
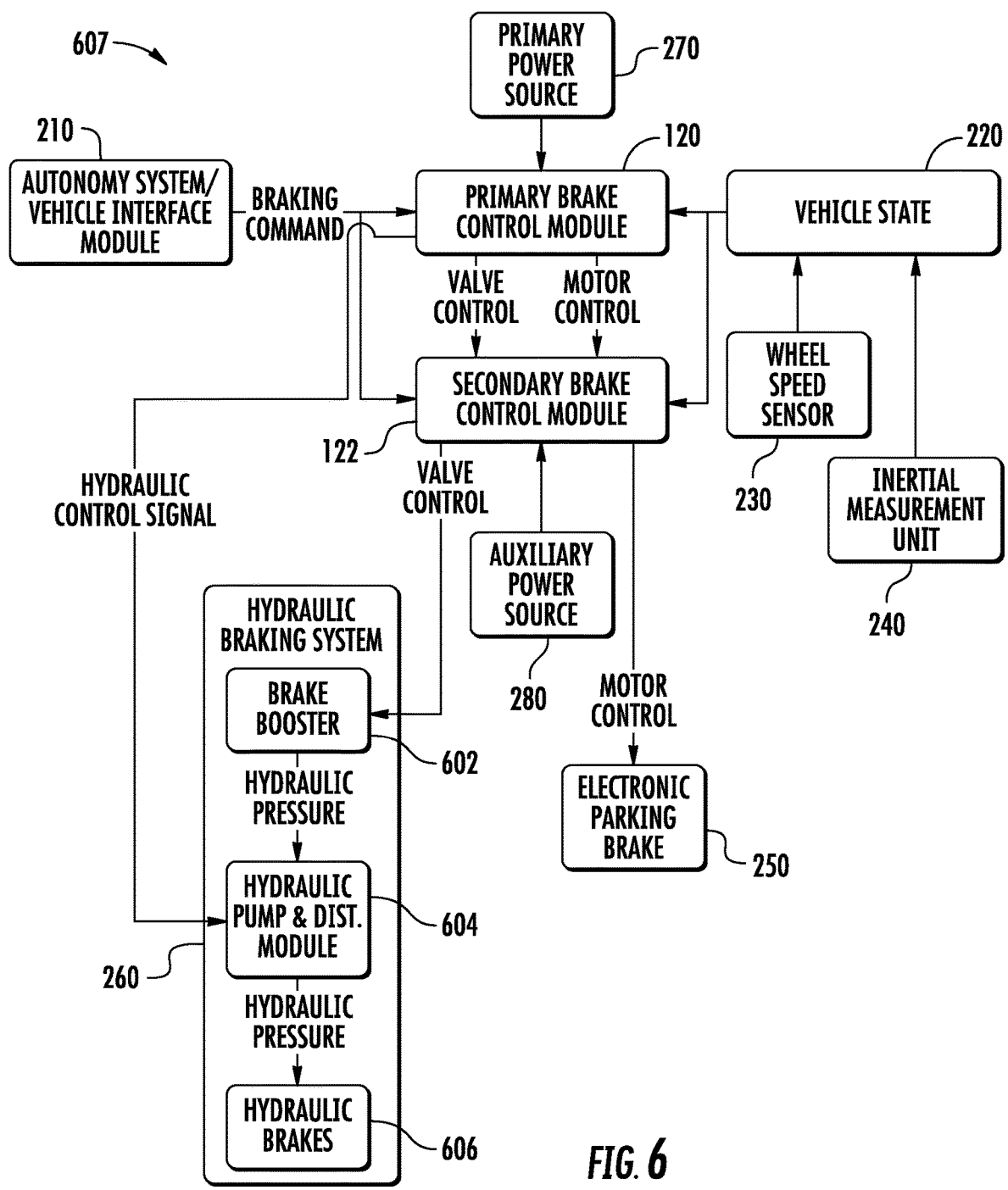
FIG. 6 depicts an example braking system for an autonomous vehicle according to example aspects of the present disclosure.

In some implementations, a braking system of the vehicle 10 can include a brake booster. For example, FIG. 6 depicts another vehicle control system 607, which can also be referred to as a braking system 607 or an autonomous vehicle braking system 607, and can be included in a vehicle 10. The vehicle control system 107 can include the braking system 607. The braking system 607 can include some similar components as the braking system 207 and can include some different components than that of braking system 207. Elements that are the same or similar are referred to with the same reference numerals.

For example, the braking system 607 can also include a hydraulic braking system 260. The hydraulic braking system 260 can include a brake booster 602 (e.g., electronic booster, pneumatic booster, etc.). In some implementations, the brake booster 602 can be configured to receive vacuum assistance (e.g., from an electric pump and/or engine vacuum, not shown). In some implementations, a control signal can be provided to the brake booster 602. For example, as shown in FIG. 6, the secondary brake control module 122 can provide one or more valve control signals to the brake booster 602. In some implementations, the valve control signal from the secondary brake control module 122 can be an electric and/or electronic signal. For example, in some implementations, the secondary brake control module 122 can provide a pulse-width modulated (PWM) signal to the brake booster 602. For example, the duty cycle of a PWM signal can be used to control a valve position of the brake booster 602. Other electric/electronic signals can similarly be used to control a valve position of the brake booster 602. In some implementations, the secondary brake control module can be configured to receive a valve control signal from the primary brake control module 120, and provide the valve control signal to the brake booster 602.

The brake booster 602 can apply hydraulic pressure and/or otherwise interface with a hydraulic pump and/or hydraulic distribution module 604. For example, upon receipt of a valve control signal from the secondary brake control module 122, the brake booster 602 can apply and/or amplify hydraulic pressure provided to the hydraulic pump and/or hydraulic distribution module 604. The hydraulic pump and/or hydraulic distribution module 604 can be associated with a hydraulic control unit (not shown) and can be configured to apply hydraulic pressure to one or more hydraulic brakes 606. For example, in some implementations, the hydraulic braking system 260 can be configured to brake one or more service brakes associated with one or more wheels of a vehicle 10. In some implementations, the primary brake control module 120 can be configured to provide a hydraulic control signal to the hydraulic pump and/or hydraulic distribution module 604. Accordingly, in example implementations, the primary brake control module 120 can control the hydraulic pump and distribution module 604, and the secondary brake control module 122 can control the brake booster 602 (or vice versa).

The configuration of the hydraulic braking system 260 of braking system 607 shown in FIG. 6 can provide technical improvements to an autonomous vehicle, such as its braking system. For example, concepts for autonomous braking system redundancy tend to focus on availability of control signals to the vehicle platform. In practice, actuator availability at the platform level may also be advantageous. Alteration of a vehicle's hydraulic system during up-fit can be cost prohibitive, so solutions with purely electrical/electronic changes may be of high value. Accordingly, the described configuration can provide actuator availability under single point fault conditions.

For example, vehicle braking systems of an autonomous vehicle can perform at least two major functions. The first can include providing braking assistance (e.g., at the pedal), if needed. The second function can include controlling advanced functionality (e.g., ABS, AYC, management of hydraulic pressure per braking circuit, etc.). For the present disclosure, to assure robust brake performance during autonomous operation, both control and actuator function can be available in the event of any single point of failure. For example, control availability can be provided through the secondary brake control module 122. Actuator availability can be provided through firmware modifications (e.g., without mechanical alteration). The braking system 607 can provide brake capability through a brake booster 602 and/or through direct hydraulic manipulation, as described herein. To compliment this, in some implementations, the secondary brake control module 122 can intercept and have authority over actuation of the brake booster 602, such as when control signals are sent by the primary brake control module 120. The absence of common mode failures between the brake booster and hydraulic system, and the addition of a secondary brake control module 122, can help prevent any single point of failure resulting in the loss of brake control by the vehicle 10. Moreover, the example systems of the present disclosure can leverage inherent mechanical differences between a brake booster 602 and other brake control systems, such as a primary brake control module 120 providing hydraulic control signals to a hydraulic pump and/or hydraulic distribution module 604 (e.g., due to physical separation within the vehicle 10), which can allow the system to provide robustness without expensive platform modifications.

Figure 3:
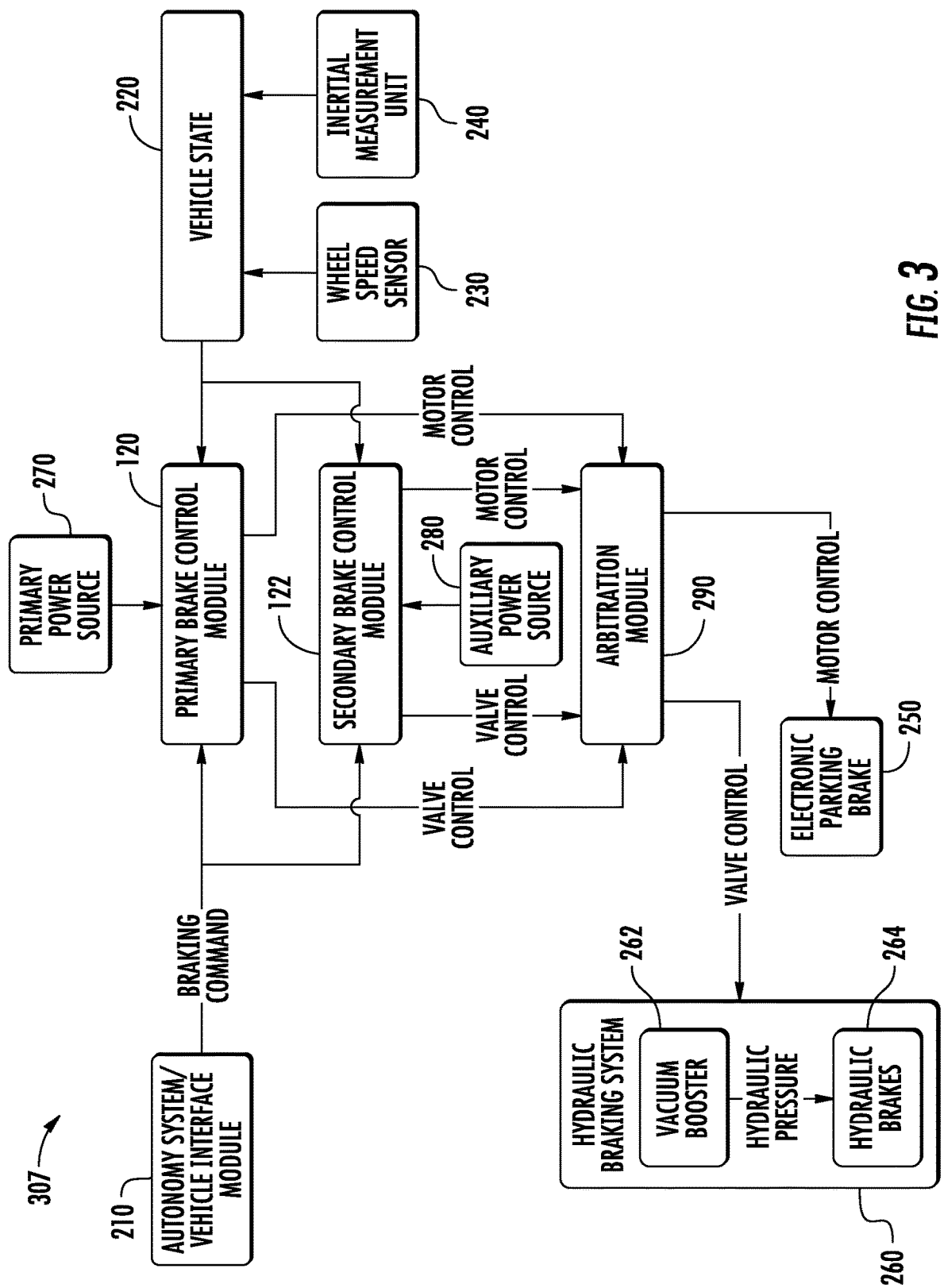
FIG. 3 depicts an example braking system for an autonomous vehicle according to example aspects of the present disclosure.

Referring now to FIG. 3, another example vehicle control system 307 according to example aspects of the present disclosure is depicted. The vehicle control system 307 can also be referred to as a braking system 307 or an autonomous vehicle braking system 307, and can be included in a vehicle 10. The vehicle control system 107 can include the braking system 307. The braking system 307 depicted in FIG. 3 is similar to the braking system 207 depicted in FIG. 2, and elements that are similar are referred to with the same reference numerals.

As shown in FIG. 3, however, rather than providing control signals to the secondary brake control module 122, the primary brake control module 120 provides control signals to an arbitration module 290. Similarly, the secondary brake control module 122 also provides control signals to the arbitration module 290. The arbitration module 290 can receive the control signals (e.g., valve control, motor control, or other control signals) and provide the respective control signals to the respective brake system. For example, the primary brake control module 120 can provide a valve control signal to the arbitration module 290, which can then provide the valve control signal to the hydraulic braking system 260. Similarly, motor control signals can be provided to the EPB 250.

In this way, the arbitration module can be configured to receive a primary brake control signal from the primary brake control module 120 and a secondary brake control signal from the secondary brake control module 122. Further, the arbitration module 290 can implement the braking action based at least in part on the primary brake control signal or the secondary brake control signal, such as, for example, providing a control signal to the respective brake system.

For example, should the arbitration module 290 receive a brake control signal from only one of the primary brake control module 120 or the secondary brake control module 122, the arbitration module 290 can implement the braking action by, for example, sending the control signal to the associated brake system. For example, if the primary brake control module 120 does not provide any control signals to a brake system in response to a braking command from the vehicle autonomy system 210, the secondary brake control module 122 can provide a control signal to the arbitration module 290, as described herein. The arbitration module 290 can then provide the control signal to the respective brake system.

In some implementations, should the arbitration module 290 receive a brake control signal from the primary brake control module 120 and the secondary brake control module 122, the arbitration module can be configured to determine which braking action to implement. For example, in some implementations, whichever brake control module 120/122 provides a control signal indicating the most braking (i.e., highest deceleration), the arbitration module 290 can implement that braking action by providing the control signal to the associated brake system. In some implementations, the arbitration module 290 can be included in or otherwise a part of the secondary brake control module 122. In this way, the arbitration module 290 can implement the braking action based at least in part on the primary brake control signal or the secondary brake control signal.

The secondary brake control module 122 described herein can include various hardware components in order to allow the secondary brake control module 122 to perform the functionality described herein. For example, the secondary brake control module 122 can include one or more processors and one or more memory devices, which can store instructions and data in order to determine a failure of the primary brake control module 120 to brake the vehicle, and in response, implement a braking action. In some implementations, the secondary brake control module 122 can include appropriate communications harnesses in order to allow the secondary brake control module to communicate with other components of a vehicle control system 307, such as brake system harnesses (e.g., hydraulic braking system 260 harness, EPB 250 harness), a wheel speed sensor 230 input harness, an IMU 240 input harness, one or more VIM or CAN harnesses, a primary brake control module 120 communication harness, and/or any other harnesses necessary to perform the functionality disclosed herein. Further, in some implementations, the secondary brake control module can include an auxiliary power source 280 and/or a harness to allow the secondary brake control module 122 to receive power from an auxiliary power source 280, as well as a harness to allow the secondary brake control module 122 to receive power from a primary power source 270.

Figure 7:
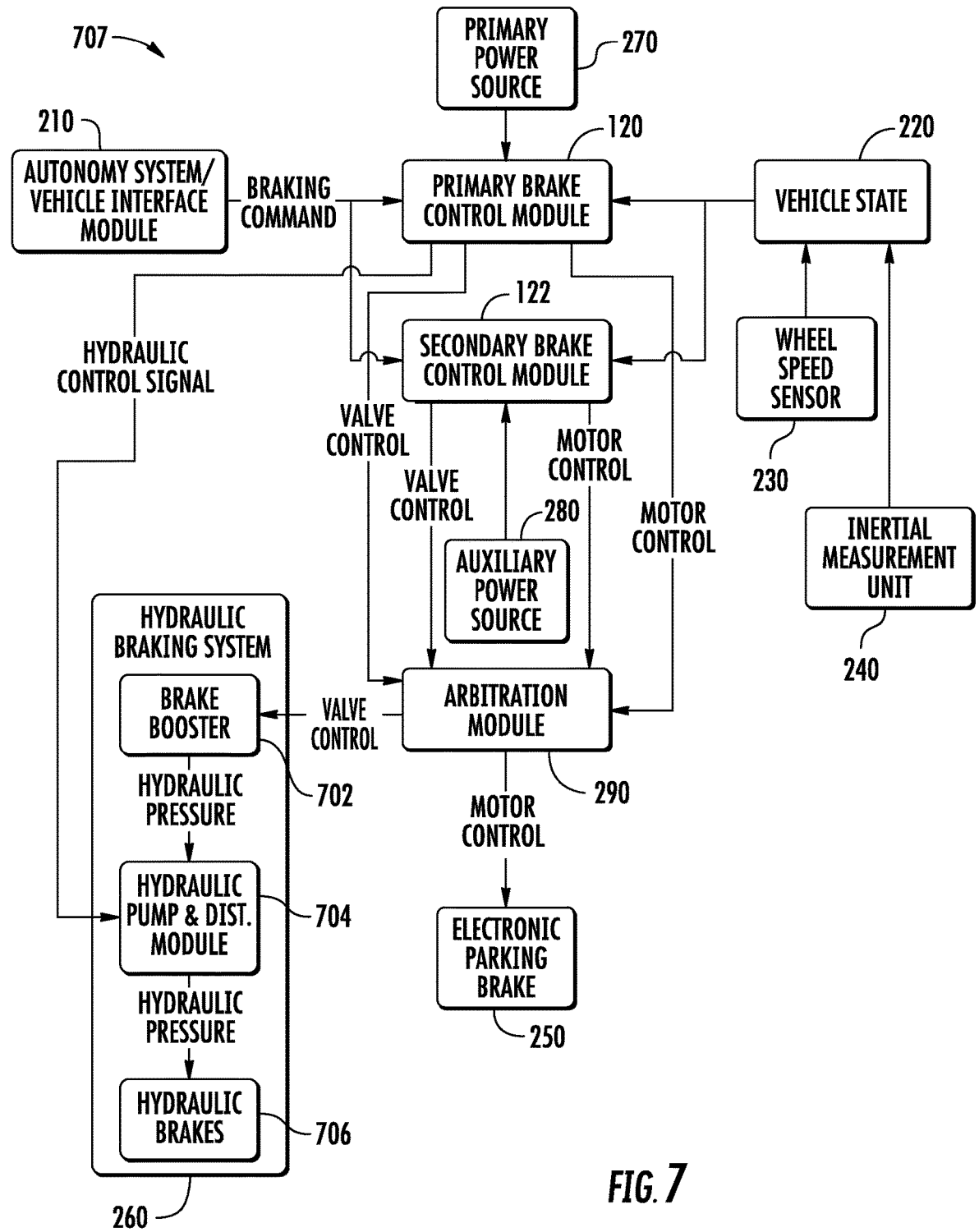
FIG. 7 depicts an example braking system for an autonomous vehicle according to example aspects of the present disclosure.

In some implementations, such a braking system of the vehicle 10 can include a brake booster. FIG. 7 depicts another vehicle control system 707, which can also be referred to as a braking system 707 or an autonomous vehicle braking system 707, and can be included in a vehicle 10. The vehicle control system 107 can include the braking system 707. The braking system 707 can include some similar components as the braking system 307 and can include some different components than that of braking system 307. Elements that are the same or similar are referred to with the same reference numerals.

For example, the braking system 707 can also include a hydraulic braking system 260. The hydraulic braking system 260 can include a brake booster 702 (e.g., electronic booster, pneumatic booster, etc.), a hydraulic pump and/or hydraulic distribution module 704, and one or more hydraulic brakes 706. Brake booster 702 can provide the same and/or similar functionality as a brake booster 602, hydraulic pump and/or hydraulic distribution module 704 can provide the same and/or similar functionality as a hydraulic pump and/or hydraulic distribution module 604, and the hydraulic brakes 706 can provide the same and/or similar functionality as the hydraulic brakes 606, as disclosed herein.

In some implementations, a control signal can be provided to the brake booster 702 by arbitration module 290. For example, arbitration module 290 can be configured to receive valve control signals from the primary brake control module 120 and the secondary brake control module 122, and determine which valve control signal to implement (i.e., arbitrate between the two signals before providing a valve control signal to brake booster 702). For example, in some implementations, the arbitration module 290 can receive a valve control signal from both the primary brake control module 120 and the secondary brake control module 122, and can select whichever valve control signal provides the most braking. Other signal arbitration techniques, such as those disclosed herein, can similarly be used. The arbitration module 290 can then provide the selected valve control signal to the brake booster 702. In some implementations, the valve control signal from the arbitration module 290 can be an electric and/or electronic signal. For example, in some implementations, the arbitration control module 290 can provide a pulse-width modulated (PWM) signal to the brake booster 702. For example, the duty cycle of a PWM signal can be used to control a valve position of the brake booster 702. Other electric/electronic signals can similarly be used to control a valve position of the brake booster 702.

The brake booster 702 can apply hydraulic pressure and/or otherwise interface with a hydraulic pump and/or hydraulic distribution module 704. This can include, for example, vacuum assistance. The hydraulic pump and/or hydraulic distribution module 704 can be associated with a hydraulic control unit (now shown) and can be configured to apply hydraulic pressure to one or more hydraulic brakes 706. For example, in some implementations, the hydraulic braking system 260 can be configured to brake one or more service brakes associated with one or more wheels of a vehicle 10. Accordingly, in example implementations, the primary brake control module 120 can control the hydraulic pump and distribution module 704, and the secondary brake control module 122 can control the brake booster 702 (or vice versa).

Figure 4:
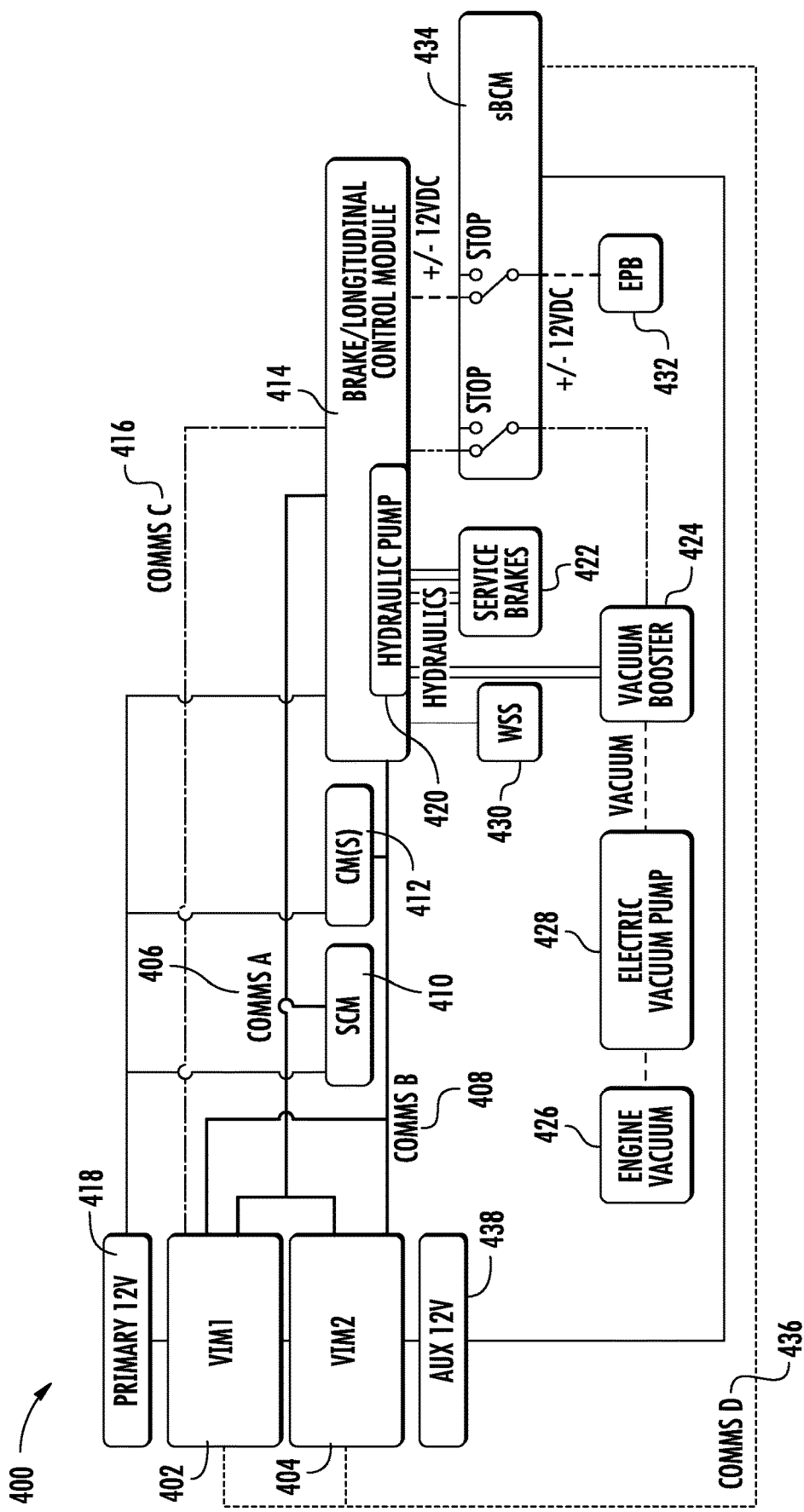
FIG. 4 depicts an example braking system for an autonomous vehicle according to example aspects of the present disclosure.

Referring now to FIG. 4, an example braking system 400 according to additional aspects of the present disclosure is depicted. The braking system 400 includes elements that are similar to the braking systems depicted in FIGS. 2, 3, 6, and 7.

For example, as shown, the braking system 400 can include a first VIM (VIM1) 402 and a second VIM (VIM2) 404. For example, VIM1 402 and VIM2 404 can operate in a distributed, parallel configuration and/or a redundant/backup configuration. Both VIM1 402 and VIM2 404 can be configured to communicate with various components over one or more communication lines/networks ("COMMS"), such as one or more CANs. For example, the braking system 400 can include a COMMS A 406 and a COMMS B 408. For example, as depicted, a Steering Control Module ("SCM") 410 is coupled to the COMMS A 406, and one or more other Control Modules ("CM(S)") 412 can be coupled to the COMMS B 408. The SCM 410 can be configured to control steering of a vehicle 10, and the CM(s) 412 can perform various other control functions.

A Brake/Longitudinal Control Module 414 can also be coupled to the COMMS A 406. In some implementations, the Brake/Longitudinal Control Module 414 can include a primary brake control module. For example, VIM1 402 and/or VIM2 404 can send one or more braking commands over the COMMS A 406 to the Brake/Longitudinal Control Module 414. In response, the Brake/Longitudinal Control Module 414 can brake the vehicle 10.

In some implementations, the braking system 400 can also include a COMMS C 416. The COMMS C 416 can be, for example, a dedicated, protected communication bus between the VIM1 402 (and/or the VIM2 404) and the Brake/Longitudinal Control Module 414. For example, while in various implementations, certain control systems such as the SCM 410, the CM(S) 412, and/or other control systems can be coupled to the COMMS A 406 and/or the COMMS B 408, the COMMS C 416 can be a dedicated communication bus between the VIM1 402 (and/or the VIM2 404) and the Brake/Longitudinal Control Module 414 to which no other components are connected.

A primary power source 418 can provide power to various components of the braking system 400. For example, as shown, the primary power source 418 can provide power to the VIM1 402, the VIM2 404, the SCM 410, the CM(S) 412, and the Brake/Longitudinal Control Module 414. In some implementations, the primary power source 418 can be a 12V DC power source. In other implementations, the primary power source 418 can be an AC power system, and/or can operate at various voltages.

The Brake/Longitudinal Control Module 414 can be coupled to service brakes 422 which in some implementations can be hydraulic brakes. For example, Brake/Longitudinal Control Module 414 can control a hydraulic pump 420, which can provide hydraulic pressure to the service brakes 422 to cause the service brakes 422 to brake the vehicle 10. Further, in some implementations, a valve control signal can be sent to a vacuum booster 424 to control a valve to apply or amplify hydraulic pressure provided to the service brakes 422, such as a motor/solenoid valve or a pneumatic valve. For example, an engine vacuum 426 and/or an electric vacuum pump 428 can provide a vacuum to a vacuum booster 424, which can then amplify or provide hydraulic pressure applied to service brakes 422. In this way, the hydraulic braking system can be controlled.

A wheel speed sensor (WSS) 430 can also be coupled to the Brake/Longitudinal Control Module 414, which can use data indicative of a vehicle state from the WSS 430, such as acceleration or velocity data, to control the brake systems. For example, in some implementations, the Brake/Longitudinal Control Module 414 can use data from the WSS 430 to control how much hydraulic pressure to apply to service brakes 422.

The braking system 400 can further include an EPB 432. EPB 432 can be, for example, a parking brake or emergency brake used to immobilize the vehicle 10.

The braking system 400 can further include a secondary brake control module ("sBCM") 434, which can be coupled to VIM1 402 and/or VIM2 404 via a COMMS D 436. In some implementations, the secondary brake control module 434 can be powered by an auxiliary power source 438. For example, the auxiliary power source 438 can be a 12V DC auxiliary power source. In other implementations, the auxiliary power source 438 can be an AC power system, and/or can operate at various voltages.

As shown, the secondary brake control module 434 can be coupled between the Brake/Longitudinal Control Module 414 and one or more brake systems. For example, the Brake/Longitudinal Control Module 414 can provide a hydraulic braking system control signal, such as a valve control signal for the vacuum booster 424 (or other hydraulic braking system signal to another hydraulic braking system component), to the secondary brake control module 434, which can provide the valve control signal to the vacuum booster 424. Similarly, the Brake/Longitudinal Control Module 414 can provide a motor control signal to the secondary brake control module 434, which can provide the motor control signal to the EPB 432.

The secondary brake control module 434 can be configured to determine when the Brake/Longitudinal Control Module 414 has failed to brake the vehicle 10, as disclosed herein. For example, in various implementations, the secondary brake control module 434 can receive braking commands from VIM1 402 and/or VIM2 404 via the COMMS D 436. Further, in some implementations, the secondary brake control module 434 can receive data indicative of a vehicle state from the WSS 430 and/or an IMU (not shown). The secondary brake control module 434 can further be configured to receive control signals from the Brake/Longitudinal Control Module 414.

The secondary brake control module can determine the failure of the Brake/Longitudinal Control Module 414 to brake the vehicle 10 by, for example, determining the primary power source 418 has faulted, determining the Brake/Longitudinal Control Module 414 has failed to control a brake system in response to a braking command from VIM1 402 and/or VIM2 404, and/or based on data indicative of the vehicle state from the WSS 430 or an IMU (not shown), as disclosed herein. In response, the secondary brake control module 434 can implement a braking action by, for example, controlling the hydraulic braking system 420-428 and/or the EPB 432, as disclosed herein.

Figure 5:
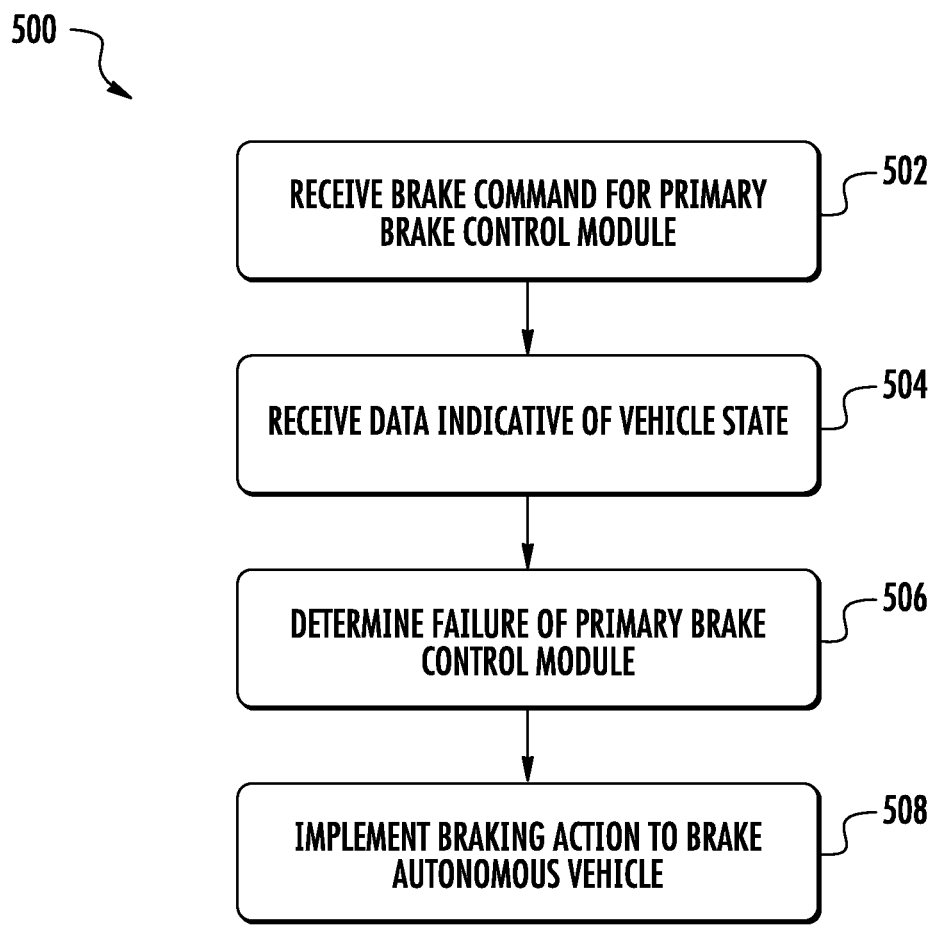
FIG. 5 depicts an example method for braking an autonomous vehicle according to example aspects of the present disclosure.

Referring now to FIG. 5, an example method (500) for braking a vehicle is depicted. Although FIG. 5 depicts steps performed in a particular order for purposes of illustration and discussion, the methods of the present disclosure are not limited to the particularly illustrated order or arrangement. The various steps of method (500) can be omitted, rearranged, combined, and/or adapted in various ways without deviating from the scope of the present disclosure. The method (500) can be implemented by a secondary brake control module. The secondary brake control module can include for example, one or more processors and one or more tangible, non-transitory computer-readable memory.

At (502), the method (500) can include receiving a braking command for a primary brake control module of the vehicle. For example, in some implementations, a vehicle autonomy 210 system can provide a motion plan to a vehicle control system 107/207/307400/607/707. The control system can include one or more VIMs 402/404, which can convert the motion plan to a braking command. The braking command can be provided by the one or more VIMs 402/404 to the primary brake control module 120/414, and can similarly provide the braking command to the secondary brake control module 122/434.

At (504), the method (500) can include receiving data indicative of a vehicle state. For example, in some implementations, one or more WSSs 230/430 and/or IMUs 240 can be configured to provide data indicative of a vehicle state to the secondary brake control module 122/434. The data indicative of the vehicle state can include, for example, data indicative of the longitudinal acceleration and/or velocity of the vehicle 10.

At (506), the method (500) can further include determining a failure of the primary brake control module based at least in part on the braking command. For example, in some implementations, the primary brake control module 120/414 can receive the braking command from the vehicle autonomy system 210 (such as via the one or more VIMs 402/404), and based on the braking command, the primary brake control module 120/414 can send a control signal to a brake system in order to brake the vehicle 10. For example, a valve control signal can be sent to a hydraulic braking system 260/420-428, or a motor control signal can be sent to an EPB 250/432.

In some implementations, the secondary brake control module 122/434 can be configured to determine a fault or failure of the primary brake control module 120/414 by, for example, receiving the braking command, but not receiving a corresponding brake system control signal. For example, in some implementations, the secondary brake control module 122/434 can be configured to receive control signals from the primary brake control module 120/414, and provide the control signals to the respective brake systems. In other implementations, the primary brake control module 120/414 can be configured to provide control signals to one or more brake systems, such as over a CAN, and the secondary brake control module 122/434 can be configured to monitor such control signals. Should the primary brake control module 120/414 fail to provide a control signal to a brake system following receipt of the braking command from the vehicle autonomy system 210, the secondary brake control module 122/434 can be configured to determine the primary brake control module 120/414 has faulted or failed. In this way, the secondary brake control module 122/434 can determine a failure of the primary brake control module 120/414 to control a brake system of the vehicle 10 to brake the vehicle 10.

In some implementations, the secondary brake control module 122/434 can determine the primary brake control module 120/414 has failed to brake the vehicle based at least in part on the data indicative of the vehicle state. For example, should the vehicle not decelerate or not decelerate at a sufficient rate following receipt of a braking command from the vehicle autonomy system 210, the secondary brake control module 122/434 can determine the primary brake control module 120/414 has failed to brake the vehicle.

In some implementations, the secondary brake control module 122/434 determine a failure of the primary brake control module 120/414 by determining a fault of a primary power source configured to provide power to the primary brake control module. For example, in some implementations, a primary power source 270/418 can power one or more braking system components, such as a primary brake control module 120, a Brake/Longitudinal Control Module 414, a VIM 402/404, a SCM 410, an CM(S) 412, and/or another braking system component. In some implementations, an auxiliary power source 280/438 can be configured to provide auxiliary (i.e., backup) power to a secondary brake control module 122/434 and or/other braking system component. In some implementations, the secondary brake control module 122/434 can be configured to receive power from both the primary power source 270/418 and the auxiliary power source 280/438. Should the secondary brake control module 122/434 determine that the primary power source 270/418 has faulted, the secondary brake control module 122/434 can be configured to determine a failure of the primary brake control module 120/414 to brake the vehicle 10.

At (508), the method (500) can further include implementing a braking action to brake the vehicle in response to determining the failure of the primary brake control module.

For example, in some implementations, the secondary brake control module 122/434 can control a hydraulic braking system 260/420-428 to brake the vehicle. For example, the secondary brake control module 122/434 can send a valve control signal to a vacuum booster 262/424 of a hydraulic braking system 260/420-428, which can cause one or more hydraulic brakes to brake the vehicle 10. In some implementations, the secondary brake control module 122/434 can control an EPB 250/432 to brake the vehicle 10. For example, a motor control signal can be sent to the EPB 250/432 to cause the EPB 250/432 to brake the vehicle 10.

In some implementations, implementing a braking action can include decelerating the vehicle, such as by reducing a velocity of the vehicle 10. In some implementations, implementing a braking action can include decelerating the vehicle 10 to a complete stop. In some implementations, implementing a braking action can include bringing the vehicle 10 to a complete stop and preventing future movement of the vehicle 10, such as by locking an EPB 250/432 until a reset of the braking system has occurred.

In some implementations, implementing the braking action to brake the autonomous vehicle can include providing a brake signal to an arbitration module 290. For example, in some implementations, an arbitration module 290 can be configured to receive control signals from both the primary brake control module 120/414 and the secondary brake control module 122/434. In such a configuration, the secondary brake control module 122/434 can be configured to implement the braking action by providing a brake signal to the arbitration module 290, as disclosed herein.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. For example, features and/or components or the entirety of one vehicle control system can be combined, incorporated into, implemented with, replaced with, substituted for, etc. one or more components or the entirety of another vehicle control system. Thus, it is intended that the present disclosure cover such alterations, variations, and equivalents.

What is claimed is:

1. An autonomous vehicle braking system, comprising:
    a primary brake control module comprising one or more processors, the primary brake control module configured to:
        receive, from a vehicle autonomy system, a braking command; and
        in response to receiving the braking command, brake an autonomous vehicle by sending one or more control signals to a brake system; and
    a secondary brake control module comprising one or more processors, wherein the secondary brake control module is configured to:
        receive the braking command from at least one of the vehicle autonomy system or the primary brake control module;
        determine, based at least in part on the braking command, a failure of the primary brake control module to brake the autonomous vehicle in response to the primary brake control module receiving the braking command; and
        in response to determining the failure of the primary brake control module to brake the autonomous vehicle, implement a braking action for the autonomous vehicle.

2. The autonomous vehicle braking system of claim 1, wherein the secondary brake control module is configured to determine that the primary brake control module has failed to brake the autonomous vehicle in response to the braking command based at least in part on data indicative of a vehicle state.

3. The autonomous vehicle braking system of claim 2, further comprising at least one of a wheel speed sensor or an inertial measurement unit; and
    wherein the data indicative of the vehicle state comprises data from at least one of the wheel speed sensor or the inertial measurement unit.

4. The autonomous vehicle braking system of claim 1, wherein receiving the braking command from at least one of the vehicle autonomy system or the primary brake control module comprises receiving the braking command from a vehicle interface module of the vehicle autonomy system.

5. The autonomous vehicle braking system of claim 1, wherein the secondary brake control module is configured to implement the braking action by controlling a hydraulic braking system to brake the autonomous vehicle.

6. The autonomous vehicle braking system of claim 1, wherein the secondary brake control module is configured to implement the braking action by controlling an electronic parking brake to brake the autonomous vehicle.

7. The autonomous vehicle braking system of claim 1, further comprising:
    a primary power source configured to provide power to the primary brake control module; and
    an auxiliary power source configured to provide power to the secondary brake control module.

8. The autonomous vehicle braking system of claim 7, wherein the secondary brake control module is configured to determine the primary brake control module has failed to brake the autonomous vehicle in response to the braking command by determining the primary power source has faulted.

9. The autonomous vehicle braking system of claim 1, further comprising:
    an arbitration module configured to receive a primary brake control signal from the primary brake control module and a secondary brake control signal from the secondary brake control module; and
    wherein the arbitration module is further configured to implement the braking action based at least in part on the primary brake control signal or the secondary brake control signal.

10. The autonomous vehicle braking system of claim 1, wherein the primary brake control module is configured to brake the autonomous vehicle in response to the braking command from the vehicle autonomy system of the autonomous vehicle by providing a control signal to the secondary brake control module; and
wherein the secondary brake control module is configured to brake the autonomous vehicle based at least in part on the control signal.

11. A method for braking an autonomous vehicle, comprising:
receiving, by one or more processors of a secondary brake control module, a braking command for a primary brake control module of the autonomous vehicle;
determining, by the one or more processors, a failure of the primary brake control module to brake the autonomous vehicle in response to the primary brake control module receiving the braking command based at least in part on the braking command; and
in response to determining the failure of the primary brake control module, implementing, by the one or more processors, a braking action to brake the autonomous vehicle;
wherein the braking command is received from at least one of the vehicle autonomy system or the primary brake control module.

12. The method of claim 11, wherein receiving, by the one or more processors, the braking command for the primary brake control module of the autonomous vehicle comprises receiving, by the one or more processors, the braking command for the primary brake control module from a vehicle autonomy system.

13. The method of claim 11, wherein determining, by the one or more processors, the failure of the primary brake control module based at least in part on the braking command comprises determining, by the one or more processors, a failure of the primary brake control module to control a brake system of the autonomous vehicle to brake the vehicle.

14. The method of claim 13, further comprising:
receiving, by the one or more processors, data indicative of a vehicle state; and
wherein determining, by the one or more processors, the failure of the primary brake control module to brake the autonomous vehicle comprises determining, by the one or more processors, the failure of the primary brake control module to brake the autonomous vehicle based at least in part on the data indicative of the vehicle state.

15. The method of claim 14, wherein receiving, by the one or more processors, data indicative of the vehicle state comprises receiving, by the one or more processors, data indicative of the vehicle state from a wheel speed sensor or an inertial measurement unit of the autonomous vehicle.

16. The method of claim 11, wherein determining, by the one or more processors, the failure of the primary brake control module based at least in part on the braking command comprises determining, by the one or more processors, a fault of a primary power source configured to provide power to the primary brake control module.

17. The method of claim 11, wherein implementing, by the one or more processors, the braking action to brake the autonomous vehicle comprises controlling a hydraulic braking system to brake the autonomous vehicle.

18. The method of claim 11, wherein implementing, by the one or more processors, the braking action to brake the autonomous vehicle comprises controlling an electronic parking brake to brake the autonomous vehicle.

19. The method of claim 11, wherein implementing, by the one or more processors, the braking action to brake the autonomous vehicle comprises providing a brake signal to an arbitration module of the autonomous vehicle.

20. An autonomous vehicle, comprising:
a vehicle autonomy system comprising one or more processors, the vehicle autonomy system configured to generate a braking command for the autonomous vehicle; and
a braking system, comprising:
a primary brake control module comprising one or more processors, the primary brake control module configured to:
receive, from the vehicle autonomy system, the braking command; and
in response to receiving the braking command, brake an autonomous vehicle by sending one or more control signals to a brake system; and
a secondary brake control module comprising one or more processors, wherein the secondary brake control module is configured to:
receive the braking command from at least one of the vehicle autonomy system or the primary brake control module;
determine, based at least in part on the braking command, a failure of the primary brake control module to brake the autonomous vehicle in response to the primary brake control module receiving the braking command; and
in response to determining the failure of the primary brake control module to brake the autonomous vehicle, implement a braking action for the autonomous vehicle.

* * * * *